No. 727,236. Patented May 5, 1903.

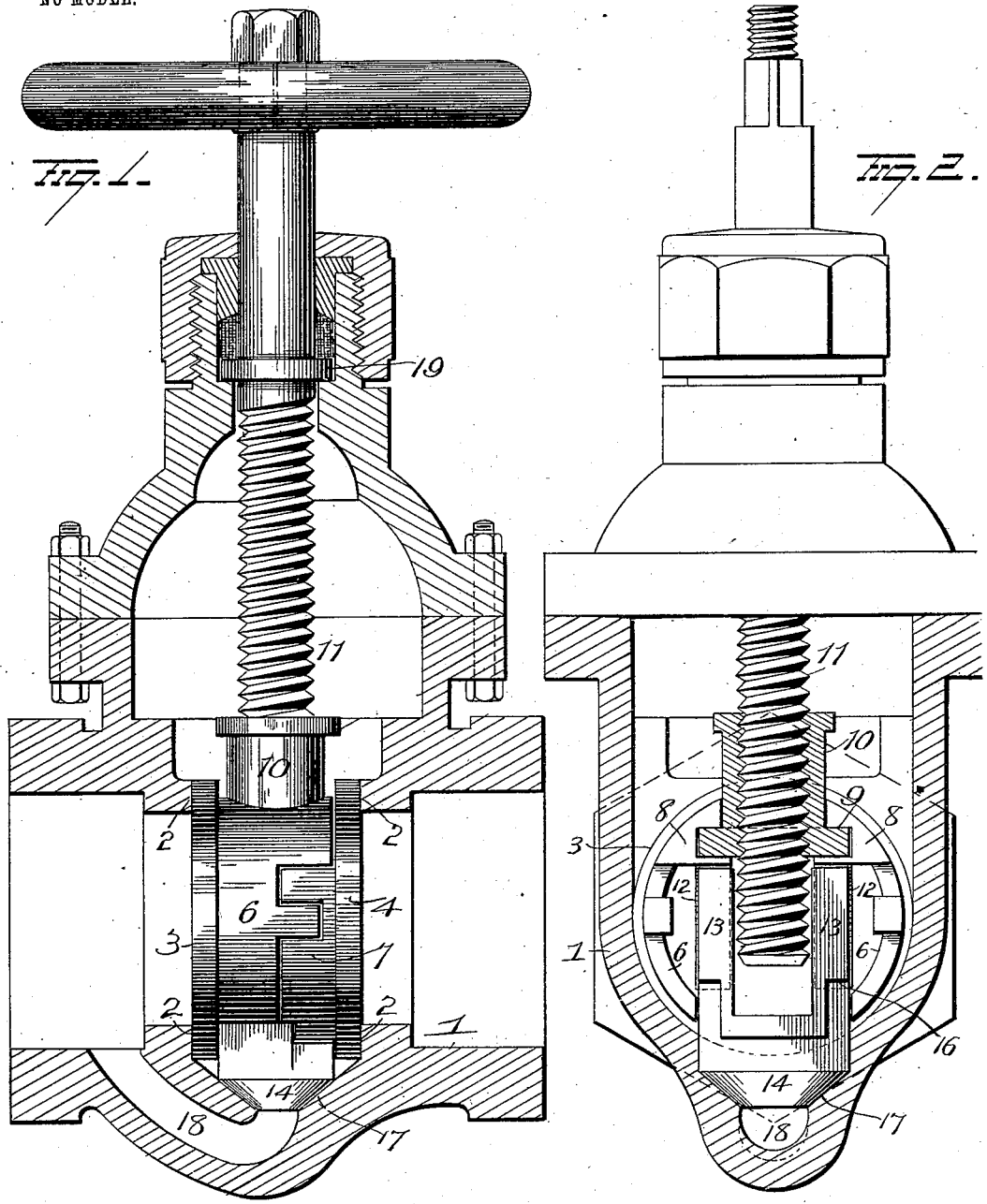

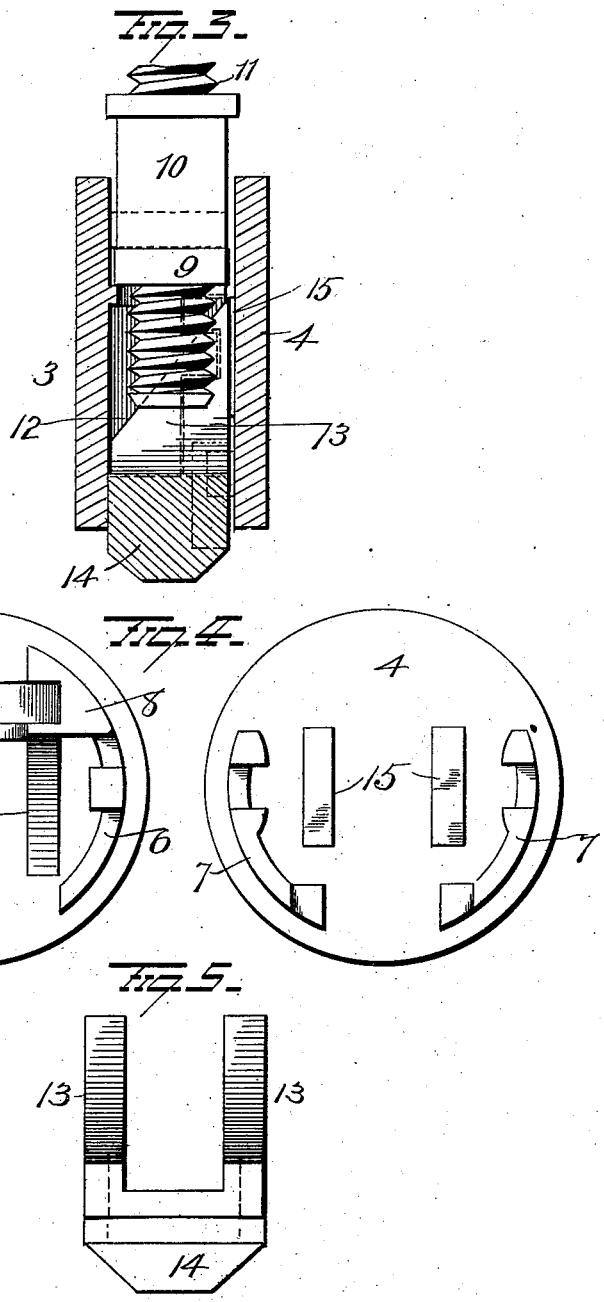

UNITED STATES PATENT OFFICE.

WILLIAM P. WALLIS, JR., AND GEORGE G. STRAUB, OF WILLIAMSPORT, PENNSYLVANIA.

VALVE.

SPECIFICATION forming part of Letters Patent No. 727,236, dated May 5, 1903.

Application filed November 29, 1902. Serial No. 133,287. (No model.)

*To all whom it may concern:*

Be it known that we, WILLIAM P. WALLIS, Jr., and GEORGE G. STRAUB, residents of Williamsport, in the county of Lycoming and State of Pennsylvania, have invented certain new and useful Improvements in Valves; and we do hereby declare the following to be a full, clear, and exact description of the invention, such as will enable others skilled in the art to which it appertains to make and use the same.

Our invention relates to an improvement in valves, and more particularly to self-cleaning valves and seats therefor, the object of the invention being to provide improvements of this character in which sand and other foreign matter cannot collect to interfere with the perfect operation of the valve; and with these objects in view the invention consists in certain novel features of construction and combinations and arrangements of parts, as will be more fully hereinafter described, and pointed out in the claims.

In the accompanying drawings, Figure 1 is a view in section illustrating our improvements. Fig. 2 is a view in section at right angles thereto, and Figs. 3, 4, and 5 are detail views of the parts of the valve.

1 represents a pipe-coupling which forms the casing of our improved valve, having flat approximately parallel seats 2 for our improved valve sections or gates 3 and 4, which are adapted to close the water-passage through the coupling. These valve sections or gates 3 and 4 are made with curved flanges 6 and 7, respectively, which are notched, as shown, to fit each other and compel them to move vertically together, but permit them to be forced apart and tight against the seats 2, as will more fully hereinafter appear.

The valve-section 3 is made on its inner face with a grooved enlargement 8 to receive the angular head 9 of an internally-screw-threaded sleeve 10 to receive the screw-threaded valve-stem 11. Below the enlargement 8 parallel inclines 12 are provided engaging the inclined faces of wedge-shaped arms 13 of our improved supplementary valve 14, the other face of said wedges engaging enlargements 15 on the inner face of section 4. This supplementary valve 14 is notched to provide shoulders 16 to be engaged by the flanges 7 of valve section or gate 4 and be elevated thereby when the valve is opened. This supplementary valve 14 has a concaved seat 17 and is adapted to close an auxiliary duct or passage 18, communicating with the main water-passage of the coupling 1, and is adapted to collect therein sand and other foreign matter which would otherwise accumulate below the valve and prevent a tight closing thereof or cause the valve to be injured in using great force in attempting to close it.

The valve-stem 11 is provided with an annular flange 19, secured in a suitable stuffing-box, but may of course be mounted in a great many other ways, and a suitable hand-wheel or other operating mechanism is secured upon the protruding upper end of the stem to facilitate turning it to operate the valve, as will now be explained.

The operation of our improvements is as follows: In Fig. 1 the valve is shown closed. To open it, stem 11 is turned to elevate sleeve or nut 10 on the stem, and thereby raise the valve and open the water-passage. To close the valve, the stem is turned in the reverse direction and moves the sleeve 10 downward until supplementary valve 14 is on its seat and force such sand into duct or passage 18 as may accumulate. When the supplementary valve is on its seat, a further downward pressure on the sleeve 10 will, owing to the wedges 13 of the supplementary valve engaging the inclines 12 of valve section or gate 3, force the gates apart and tight against the seats and most effectually close the water-passage.

The auxiliary duct or passage 18 serves to accumulate therein the sand and other foreign material which is washed out by the pressure of water, and thus permit a self-cleaning of the casing and prevent injury to the valve caused by the collection of sand, which is a very common objection to all valves of this character now in use.

A great many changes might be made in the general form and arrangement of parts described without departing from our invention, and hence we do not confine ourselves to the precise construction set forth, but consider ourselves at liberty to make such slight changes and alterations as fairly fall within the spirit and scope of our invention.

Having fully described our invention, what we claim as new, and desire to secure by Letters Patent, is—

1. The combination with a valve-casing forming a water-passage and a valve to close said passage, of a supplementary valve carried by the main valve and means to operate the supplemental valve to close an auxiliary duct or passage communicating with the main water-passage in advance of the main valve.

2. The combination with a valve-casing forming a water-passage and a main valve comprising two sections to close said water-passage, of a supplementary valve at the bottom of the main valve, carried thereby and adapted to close an auxiliary duct and means operated by the supplemental valve to separate the sections of the main valve to force them against their seats.

3. The combination with a valve-casing having opposite valve-seats in its main water-passage and an auxiliary duct running from a point between the valve-seats to the main passage at one side thereof, of gate-valves to engage the main seats, a supplementary valve to close the auxiliary duct and means operated by the supplemental valve to force the main valves apart and against their seats.

4. In a self-cleaning valve and casing therefor, the combination with a valve-casing having a water-passage therethrough and approximately parallel valve-seats in the passage, and said casing having an auxiliary duct extending from between the valve-seats to one side thereof and forming a concave valve-seat between the main valve-seats, of gate-valves to engage the main seats, a supplementary valve to close the auxiliary duct or passage and means operated by the supplemental valve to force the gate-valves apart and against their seats.

5. In a self-cleaning valve and casing therefor, the combination with a pipe-coupling having parallel vertical valve-seats therein and an auxiliary duct or passage running from the main passage to a point between the main valve-seats, of gate-valves to engage the main valve-seats, a supplemental valve carried by the gate-valves and adapted to close the auxiliary duct or passage and wedges on the supplemental valve to force the gates apart and against their seats, and means for operating said valves.

In testimony whereof we have signed this specification in the presence of two subscribing witnesses.

WILLIAM P. WALLIS, JR.
GEORGE G. STRAUB.

Witnesses:
HOWARD T. JANNEY,
HUGH GILMORE.